US011707886B2

(12) United States Patent
Nagar et al.

(10) Patent No.: US 11,707,886 B2
(45) Date of Patent: Jul. 25, 2023

(54) NARROW PASSAGE REPAIR USING 3D PRINTING

(71) Applicant: International Business Machines Corporation, Armonk, NY (US)

(72) Inventors: Raghuveer Prasad Nagar, Kota (IN); Sarbajit K. Rakshit, Kolkata (IN)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 18/157,129

(22) Filed: Jan. 20, 2023

(65) Prior Publication Data

US 2023/0150195 A1    May 18, 2023

Related U.S. Application Data

(62) Division of application No. 17/444,924, filed on Aug. 12, 2021, now Pat. No. 11,559,943.

(51) Int. Cl.
    *B29C 64/165*        (2017.01)
    *B29C 64/393*        (2017.01)
    (Continued)

(52) U.S. Cl.
    CPC .......... *B29C 64/165* (2017.08); *B29C 64/209* (2017.08); *B29C 64/295* (2017.08);
    (Continued)

(58) Field of Classification Search
    None
    See application file for complete search history.

(56) References Cited

U.S. PATENT DOCUMENTS 9,075,097 B2    7/2015    Kobayashi
9,307,592 B2    4/2016    Chen
    (Continued)

FOREIGN PATENT DOCUMENTS

CN    102067248 A    5/2011
CN    104441667 A    3/2015
    (Continued)

OTHER PUBLICATIONS

Benjamin Goldschmidt, "3D Printing Repair: Use Your Printer to Fix Everything," Updated Jan. 21, 2020, https://all3dp.com/2/3d-printing-repair-how-to-use-your-printer-to-fix-everything/, retrieved from internet on Jun. 8, 2021, 11 pages.

(Continued)

*Primary Examiner* — Yung-Sheng M Tsui
(74) *Attorney, Agent, or Firm* — Grant Johnson

(57) ABSTRACT

Aspects of this disclosure include a method for repairing a component having narrow passage, a three-dimensional printer, and composition for three-dimensional printing. One embodiment of the method may comprise mixing a filler material for three-dimensional printing with a carrier fluid, and applying a controlled electromagnetic field to bias the filler material towards a repair location in a narrow passage of a component. The method may further comprise coating a ferromagnetic material with the filler material to form a microcapsule, wherein the ferromagnetic material is adapted to interact with the controlled electromagnetic field to attract the microcapsule to the repair location. 3D printing techniques may be used to coat the ferromagnetic core with the filler material.

16 Claims, 6 Drawing Sheets

(51) Int. Cl.
  B33Y 10/00 (2015.01)
  B33Y 50/02 (2015.01)
  B29C 64/209 (2017.01)
  B29C 64/295 (2017.01)
  B33Y 30/00 (2015.01)

(52) U.S. Cl.
  CPC ............ B29C 64/393 (2017.08); B33Y 10/00 (2014.12); B33Y 30/00 (2014.12); B33Y 50/02 (2014.12); *B29K 2995/0008* (2013.01)

(56) References Cited

U.S. PATENT DOCUMENTS

| | | | |
|---|---|---|---|
| 9,587,108 | B2 | 3/2017 | Boday |
| 11,428,671 | B2* | 8/2022 | Fan ................ G01N 29/043 |
| 2012/0249375 | A1 | 10/2012 | Heino |
| 2015/0001768 | A1 | 1/2015 | Kia |
| 2016/0141085 | A1 | 5/2016 | Heino |
| 2017/0348904 | A1* | 12/2017 | Chang ............... B29C 64/393 |
| 2018/0126663 | A1* | 5/2018 | Jun ................... B33Y 80/00 |
| 2019/0237228 | A1 | 8/2019 | Wang |
| 2019/0275737 | A1 | 9/2019 | Hsiao |
| 2020/0232592 | A1* | 7/2020 | Ma ..................... B22F 12/53 |
| 2020/0307096 | A1 | 10/2020 | Simonin |
| 2021/0050858 | A1 | 2/2021 | Wang |
| 2022/0023948 | A1* | 1/2022 | Muylle .............. B33Y 10/00 |

FOREIGN PATENT DOCUMENTS

| | | | | |
|---|---|---|---|---|
| CN | 110773868 A | 2/2020 | | |
| CN | 112373014 A | 2/2021 | | |
| JP | 2964141 B1 | 4/2000 | | |
| WO | 2017008637 A1 | 1/2017 | | |
| WO | 2020098939 A1 | 5/2020 | | |
| WO | WO-2020098939 A1 * | 5/2020 | ............. | B22F 10/28 |
| WO | 2021109257 A1 | 6/2021 | | |

OTHER PUBLICATIONS

International Search Report and Written Opinion dated Sep. 14, 2022 from International Application No. PCT/CN2022/099608, 10 pages.

Nagar et al., "Narrow Passage Repair Using 3D Printing", U.S. Appl. No. 17/444,924, filed Aug. 12, 2021, 37 pages.

Tess Boissonneault, "3D printed rubber-like material can self-repair when broken," Feb. 19, 2019, https://www.3dprintingmedia.network/3d-printed-self-repair-materials/, retrieved from internet on Jun. 8, 2021, 4 pages.

Thijsbeerkens, "Repair Using 3D Printing: Main Guide," Published Jun. 25, 2017, https://www.instructables.com/id/Repair-Using-3D-Printing-Main-Guide/, retrieved from internet on Jun. 8, 2021, 7 pages.

IBM, "Appendix P—List of IBM Patents or Patent Applications Treated as Related", filed herewith, 2 pages.

* cited by examiner

NARROW PASSAGE REPAIR USING 3D PRINTING

BACKGROUND

The present disclosure relates to three-dimensional (3D) printing techniques, and more specifically, to using 3D printing techniques to repair components having narrow interior passages.

The development of the EDVAC system in 1948 is often cited as the beginning of the computer era. Since that time, computer systems have evolved into extremely complicated devices. Today's computer systems typically include a combination of sophisticated hardware and software components, application programs, operating systems, processors, buses, memory, input/output devices, and so on. As advances in semiconductor processing and computer architecture push performance higher and higher, even more advanced computer software has evolved to take advantage of the higher performance of those capabilities, resulting in computer systems today that are much more powerful than just a few years ago.

One application of this new capability is three-dimensional (3D) printing. Three-dimensional printing, also referred to as additive manufacturing, typically involves receiving a computer-aided design (CAD) model, splitting the CAD model into numerous layers, and then printing each layer sequentially to physically manufacture a component. The 3D printer hardware may function by any number of techniques and processes that are configured to fuse, join, or otherwise combine material. For example, 3D printing may be performed by vat photopolymerization, material jetting, binder jetting, powder bed fusion, material extrusion, directed energy deposition, sheet lamination, and/or other techniques.

3D printing has been successfully used in prototype manufacturing and in custom manufacturing of relatively small numbers of components.

SUMMARY

According to embodiments of the present disclosure, a method for repairing a component having narrow passage, comprising mixing a filler material for three-dimensional (3D) printing with a carrier fluid, and applying a controlled electromagnetic field to bias the filler material towards a repair location in a narrow passage of a component. The method may further comprise coating a ferromagnetic material with the filler material to form a microcapsule, wherein the ferromagnetic material is adapted to interact with the controlled electromagnetic field to attract the microcapsule to the repair location. 3D printing techniques may be used to coat the ferromagnetic core with the filler material.

According to embodiments of the present disclosure, a three-dimensional printer, comprising: one or more processors, and a memory communicatively coupled to the one or more processors. The memory may comprise instructions which, when executed by the one or more processors, cause the one or more processors to perform a method comprising coating a ferromagnetic material with a filler material to form a microcapsule, and applying a controlled magnetic field to attract the microcapsule towards a repair location in a narrow passage of a component.

According to embodiments of the present disclosure, a composition for three-dimensional printing, comprising a carrier fluid, and a microcapsule suspended in the carrier fluid, wherein the microcapsule comprises a filler material coating a ferromagnetic core. The filler material may be formed around the ferromagnetic core using three-dimensional printing.

The above summary is not intended to describe each illustrated embodiment or every implementation of the present disclosure.

BRIEF DESCRIPTION OF THE DRAWINGS

The drawings included in the present application are incorporated into, and form part of, the specification. They illustrate embodiments of the present disclosure and, along with the description, serve to explain the principles of the disclosure. The drawings are only illustrative of certain embodiments and do not limit the disclosure.

Figure 1A:
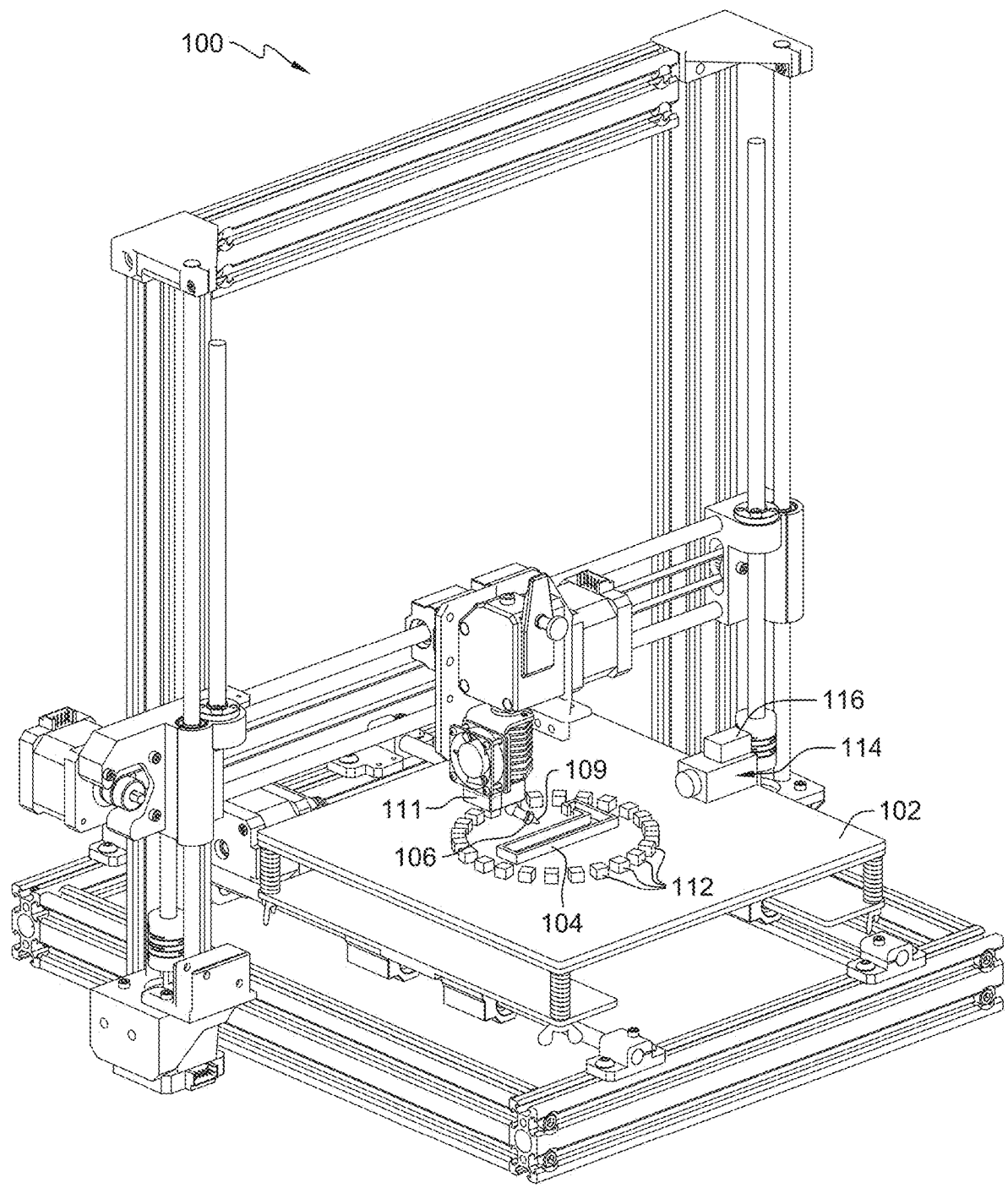
FIG. 1A is a side view of an example 3D printer, consistent with some embodiments of the present disclosure.

While the invention is amenable to various modifications and alternative forms, specifics thereof have been shown by way of example in the drawings and will be described in detail. It should be understood, however, that the intention is not to limit the invention to the particular embodiments described. On the contrary, the intention is to cover all modifications, equivalents, and alternatives falling within the spirit and scope of the invention.

DETAILED DESCRIPTION

Aspects of the present disclosure relate to 3D printing techniques; more particular aspects relate to using 3D printing techniques to repair components having narrow interior passages. While the present disclosure is not necessarily limited to such applications, various aspects of the disclosure may be appreciated through a discussion of various examples using this context.

Despite advances in manufacturing technology, defects still occur. In many cases, the manufacturers may want to rework the resulting component to remove or mitigate these defects. Similarly, manufactured items still get damaged in the field and/or decay over time, whether originally 3D printed or made using conventional processes. Owners of such manufactured items may want to repair some of their individual components.

3D printing may be used to add material to a defect site or a damage/decay site (generically, the "repair location") of a component and/or to add material to the repair location (generically, to "repair" the component). In some specific applications, however, the shape of the component may make it difficult to physically access the repair location. One common example is a repair location located on an inner surface of a narrow passage, such as a pipe or manifold. In such a case, it may be difficult to properly position the 3D printer hardware to perform the repair. That is, the 3D printer hardware may not be able to physically enter and/or pass through the narrow passage a sufficient distance to reach the repair location.

Accordingly, one aspect of the disclosure is a method and system to repair an inner surface of a narrow passage in a component using 3D printing techniques. Some embodiments may include a system and method by which a material being applied by 3D printing techniques ("filler material") may be transported to the repair location by a carrier fluid. In some embodiments, a controlled electromagnetic field, such as a magnetic field or an electrical field, may be created and/or applied to attract, or otherwise bias, the filler material toward and onto the repair location via the carrier fluid. A heat source, or other appropriate solidification method, may then be applied to the component after sufficient filler material reaches the repair location to cure the filler material, thereby creating a patch at the repair location.

In some embodiments, the filler material may be mixed with the carrier fluid, which in turn, may be directed into and/or caused to flow through a narrow passage to repair location. The electromagnetic field may be applied externally to the component near the repair location to attract the filler material in the carrier fluid to the repair location. In some embodiments, this electromagnetic field may further induce movement of the carrier fluid and/or filler material through the narrow passage, which may further mechanically draw the filler material to the repair location.

Based on a position of the repair location and a real-time volumetric profile of the repair location, an appropriate electromagnetic field may be calculated, and then created, so that the filler material will deposit onto the repair location in the desired thickness and in the desired profile. Some embodiments may generate the real-time volumetric profile of the repair location using an appropriate scanning technology, such as light imaging, ultrasound, and/or X-rays. The output of the scanning may be analyzed in real time to calculate the volume of additional filler material that will be required to repair the defect or decay in a uniform and sufficient manner, and to control the electromagnetic field to attract the calculated amount of additional filler material to the repair location. These embodiments may be desirable because they may reduce, or even minimize, excess material flow and/or material waste.

In some embodiments, the filler material may be supplied in the form of microcapsules. In some embodiments, the microcapsules may comprise a coating of the filler material formed around a ferromagnetic core, may be suspended in a carrier fluid, and may flow through the narrow passage using the carrier fluid as a medium. In some embodiments, the 3D printer hardware may form microcapsules in the carrier fluid using 3D printing techniques. That is, the 3D printer hardware may create (i.e., print) the coating around the ferromagnetic core on-demand. In other embodiments, coated ferromagnetic particles may be made by other processes and added as a completed whole to the carrier fluid. One feature and advantage of embodiments using coated ferromagnetic particles is that an external magnetic force may be applied near the repair location to attract the filler towards and onto the repair location area. Then, with the appropriate solidification method, the filler material may be cured into the repair location to repair the component.

In some embodiments, the microcapsules may comprise a burstable shell of ferromagnetic material formed around a core made from filler material. These burstable shells may be configured to rupture when exposed to a changing electromagnetic field and/or an electromagnetic field of sufficient strength. As with the previous embodiments, these burstable shell microcapsules may be controllably directed through the narrow passage to the repair location using the electromagnetic field. These embodiments may further include modulating the electromagnetic field to rupture the burstable ferromagnetic shells, and then using the appropriate solidification method to solidify the now-released filler material from the microcapsules' cores. Some of these embodiments may further include using the real-time volumetric scan to control the magnetic field such that only the microcapsules in and/or proximate to the repair location are ruptured, thereby controllably depositing the filler material at the repair location in a uniform and sufficient manner.

Aspects of the present disclosure may include a 3D printer platform having inductors surrounding all or components of its structure. These inductors may generate a controllable magnetic field when supplied with electricity. Accordingly, aspects of the present disclosure may also include utilizing a material that is responsive to the resulting magnetic field (e.g., the microcapsules) to repair hard-to-reach locations, such as an interior surface of a narrow passage. Aspects of the present disclosure may further include creating or supplying a material that is responsive to the magnetic field (e.g., the microcapsules) to an interior passageway of the component during the repair process. Further aspects of the present disclosure may include controllably supplying electricity to the inductors during the repair process in order to controllably generate a magnetic field that manipulates portions of the material that are responsive to the magnetic field (e.g., the microcapsules).

Referring now to the figures, FIG. 1A is a side view of an example 3D printer 100, consistent with some embodiments of the present disclosure. The 3D printer 100 includes a platform 102 upon which a component to be repaired 104 ("component") may be provided. The component 104 may include a narrow interior passage (see FIG. 2 for more detail). A nozzle 106 may be configured to deliver a carrier fluid and/or microcapsules (see FIGS. 2, 3A, and 3B) into the narrow passage at a predetermined feed rate using an orifice of predetermined size with a predetermined back-pressure and at a predetermined temperature. The nozzle 106 may articulate in three dimensions using, for example, a ball-and-socket joint, where the nozzle 106 is attached by an extendable and retractable arm and may move about platform 102 in all three dimensions. In another example, the nozzle 106 may move in three dimensions using a track system whereby, the track moves forward and backward in the y-direction, the nozzle 106 traverses the track in the x-direction, and the track extends and retracts in the z-direction. The nozzle 106 may also include a seal 109 adapted to mate with (i.e., sealably engage) the surface of the component proximate to an entrance into the narrow passage, and to hold the carrier fluid 111 and/or microcapsules inside the narrow passage of the component 104.

The 3D printer 100 may further include a plurality of inductors 112 surrounding the platform 102 that store energy in the form of a magnetic field when supplied with an electrical current. In some embodiments, each of the inductors 112 may comprise an insulated wire wound around a core. The inductors 112 shown in FIG. 1A are purely for illustrative purposes, and more or fewer inductors 112 may be utilized in alternative embodiments. Furthermore, although a single layer of inductors 112 is shown, in some embodiments, the inductors 112 may be arranged in all three dimensions about the platform 102. Other suitable inductors 112 may include, but are not limited to, air core inductors, iron core inductors, ferrite core inductors (e.g., soft ferrite or hard ferrite), iron powder inductors, laminated core inductors, bobbin-based inductors, toroidal inductors, multi-layer ceramic inductors, film inductors, variable inductors, coupled inductors, and/or other inductors.

The 3D printer 100 may further include a scanner 114 proximate to the platform 102 for real-time monitoring of the component 104, including locating the repair location and mapping a current thickness of filler material at that repair location. The scanner 114 may, for example, comprise cameras collecting optical data, lasers collecting distance data, X-ray or ultrasound generators and detectors (which may be used to measure wall thickness), and/or other devices adapted to collect information about the component 104, the filler material, and/or the carrier fluid.

The 3D printer 100 may further include a print manager 116. The print manager 116 may be a combination of hardware and software configured to control the nozzle 106 and/or to intermittently supply electrical current to inductors 112 to controllably direct the magnetic fields around the repair location. In some embodiments, the print manager 116 may utilize real time data from the scanner 114 to controllably direct the above.

Figure 1B:
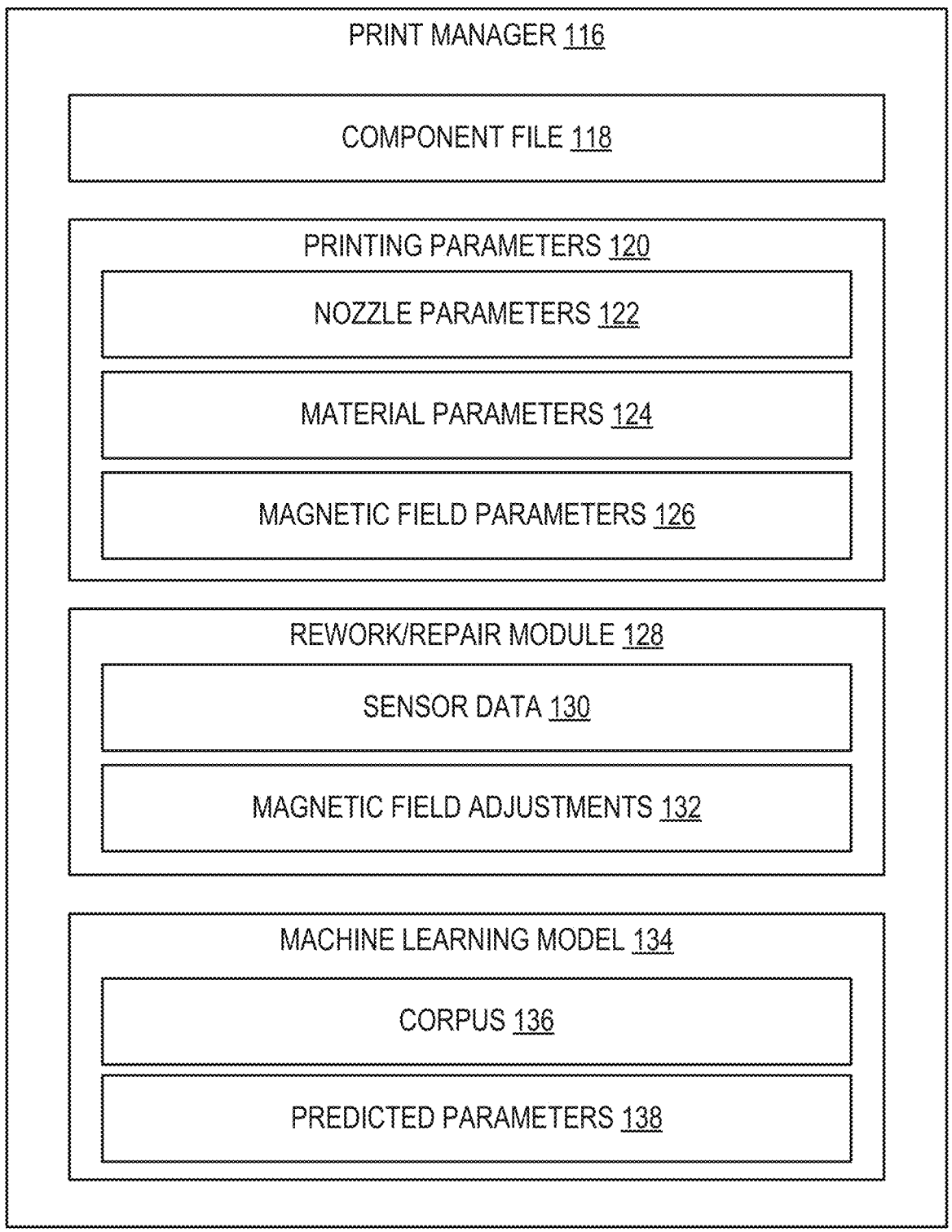
FIG. 1B schematically illustrates an example of a print manager of the example 3D printer of FIG. 1A, consistent with some embodiments of the present disclosure.

FIG. 1B schematically illustrates an example the print manager 116, consistent with some embodiments of the present disclosure. Print manager 116 may include a component file 118, printing parameters 120, repair/rework module 128, and a machine learning model 134. The component file 118 may, for example, be a computer aided design (CAD) model of the component 104 that is stored in, for example, a stereolithography (STL) file format. Component file 118 may include information related to the component's dimensions, tolerances, features, materials, and the like.

The repair/rework module 128 may further include printing parameters 120, which may include nozzle parameters 122, material parameters 124, and/or magnetic field parameters 126. The nozzle parameters 122 may include, but are not limited to, nozzle speed, nozzle feed rate, nozzle back pressure, nozzle temperature, nozzle path, and/or nozzle orifice size and/or geometry. The material parameters 124 may include, but are not limited to, material properties for one or more materials used by the 3D printer 100, such as a material type, a material melting point, a material glass transition temperature, a rheological profile of the material (e.g., viscosity, viscosity as a function of shear rate, etc.), and the like for the carrier fluid, the filler material, and/or the microcapsules. The material melting point information may be useful for defining nozzle temperature in nozzle parameters 122. The rheological profile of the material information may be used to define a nozzle feed rate, nozzle back pressure, and/or nozzle orifice size and/or geometry.

The magnetic field parameters 126 may include, for each inductor 112, an amount of electrical current to provide to the inductor 112 and a time interval during which to provide the electrical current to produce a magnetic field of a specified strength and size. In embodiments where individual inductors 112 are movable about platform 102, the magnetic field parameters 126 may further include location information for each inductor 112. In embodiments where the inductors 112 can shape, manipulate, or otherwise direct the magnetic field, the magnetic field parameters 126 may further include directionality information useful for directing the magnetic field.

The repair/rework module 128 in some embodiments may utilize sensor data 130 to make magnetic field adjustments 132. The repair/rework module 128 may be configured to measure progress of the repair/rework relative to the specifications of the component (e.g., as stored in the component file 118) in real time using the signals from the scanner 114. This sensor data 130 may be used to determine whether additional filler material may need to be attracted to the repair location. Magnetic field adjustments 132 may include electric current profiles sent to various inductors 112 generate the desired magnetic fields.

Print manager 116 further includes a machine learning model 134. Machine learning model 134 can be based on a corpus 136 of data related to magnetic manipulation of various materials (e.g., microcapsules) for various geometries of various components 104. Machine learning model 134 may be used to generate one or more predicted parameters 138. For example, predicted parameters 138 may relate to nozzle parameters 122, material parameters 124, magnetic field parameters 126, and/or magnetic field adjustments 132. The machine learning model 134 may comprise algorithms or models that are generated by performing supervised, unsupervised, or semi-supervised training on a dataset, and subsequently applying the generated algorithm or model to predict appropriate printing parameters 120 and/or appropriate magnetic field adjustments 132. Suitable machine learning algorithms may include, but are not limited to, decision tree learning, association rule learning, artificial neural networks, deep learning, inductive logic programming, support vector machines, clustering, Bayesian networks, reinforcement learning, representation learning, similarity/metric training, sparse dictionary learning, genetic algorithms, rule-based learning, and/or other machine learning techniques. For example, the machine learning algorithms can utilize one or more of the following example techniques: K-nearest neighbor (KNN), learning vector quantization (LVQ), self-organizing map (SOM), logistic regression, ordinary least squares regression (OLSR), linear regression, stepwise regression, multivariate adaptive regression spline (MARS), ridge regression, least absolute shrinkage and selection operator (LASSO), elastic net, least-angle regression (LARS), probabilistic classifier, naïve Bayes classifier, binary classifier, linear classifier, hierarchical classifier, canonical correlation analysis (CCA), factor analysis, independent component analysis (ICA), linear discriminant analysis (LDA), multidimensional scaling (MDS), non-negative metric factorization (NMF), partial least squares regression (PLSR), principal component analysis (PCA), principal component regression (PCR), Sammon mapping, t-distributed stochastic neighbor embedding (t-SNE), bootstrap aggregating, ensemble averaging, gradient boosted decision tree (GBRT), gradient boosting machine (GBM), inductive bias algorithms, Q-learning, state-action-reward-state-action (SARSA), temporal difference (TD) learning, apriori algorithms, equivalence class transformation (ECLAT) algorithms, Gaussian process regression, gene expression programming, group method of data handling (GMDH), inductive logic programming, instance-based learning, logistic model trees, information fuzzy networks (IFN), hidden Markov models, Gaussian naïve Bayes, multinomial naïve Bayes, averaged one-dependence estimators (AODE), Bayesian network (BN), classification and regression tree (CART), chi-squared automatic interaction detection (CHAID), expectation-maximization algorithm, feedforward neural networks, logic learning machine, self-organizing map, single-linkage clustering, fuzzy clustering, hierarchical clustering, Boltzmann machines, convolutional neural networks, recurrent neural networks, hierarchical temporal memory (HTM), and/or other machine learning techniques.

Figure 2:
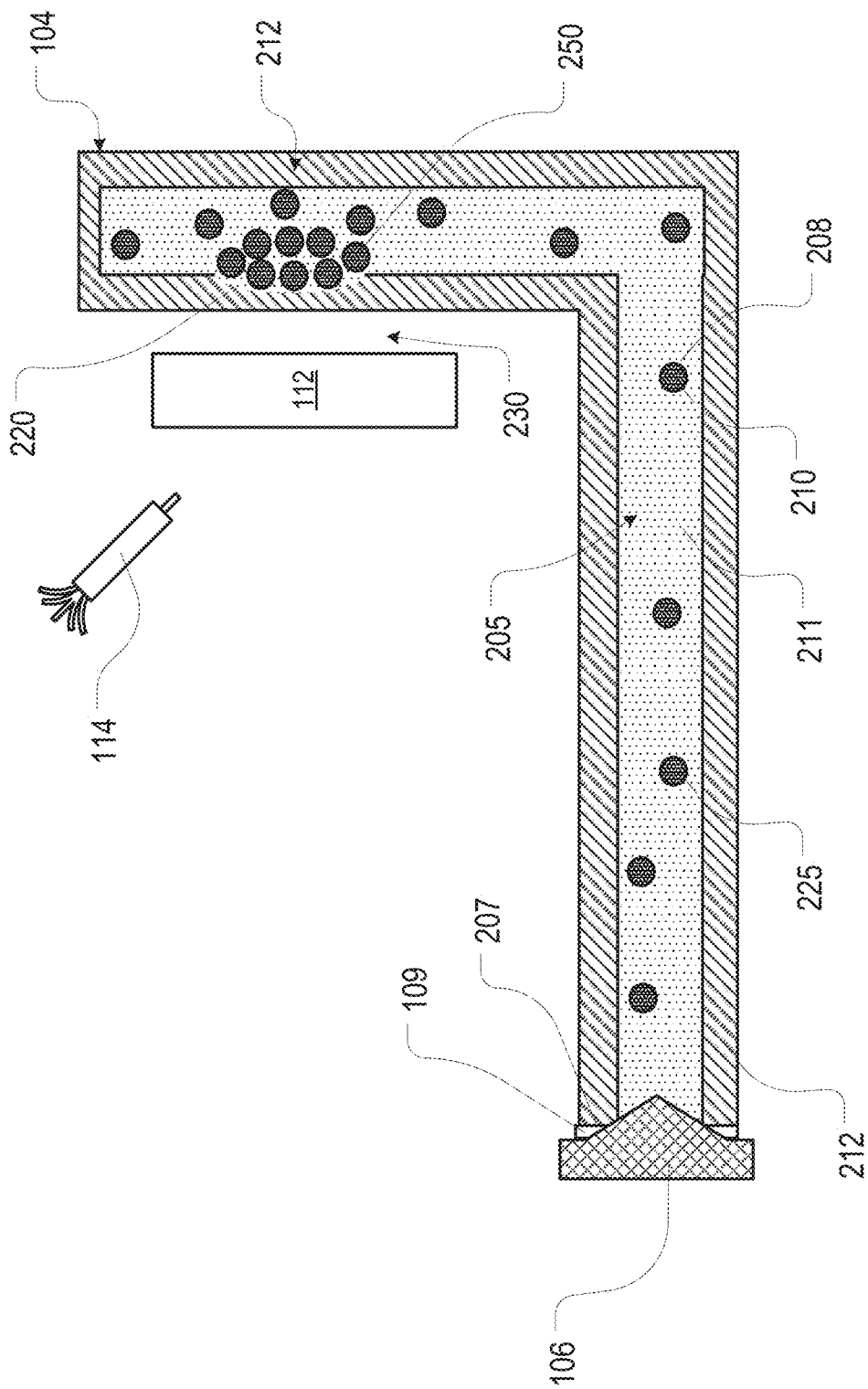
FIG. 2 is a cross sectional view of an example component to be repaired using the 3D printer described with reference to FIGS. 1A and 1B.

FIG. 2 is a cross sectional view of an example component 104 to be repaired using the 3D printer 100 described with reference to FIGS. 1A and 1B. This example component 104 comprises a narrow passage 205 surrounded by walls 212 and accessed via one or more openings 207. The walls 212 include a repair location 220 in a hard-to-reach position within the example component 104. Microcapsules 225 (depicted larger than actual in FIG. 2 for clarity of explanation, and in more detail in FIG. 3) containing a 3D printing filler material ("filler material") 208 and a ferromagnetic material 210 may being carried by a carrier fluid 211 through the narrow passage 205.

In operation, some embodiments may first identify that the inner surface of the narrow passage 205 has an area to be repaired by 3D printing (i.e., the repair location 220) using sensor data 130 collected by the scanner 114. The sensor data 130 may be analyzed by the machine learning model 134 to identify a position, dimensions, and depth a desired patch 250 to be created at the repair location 220. This may include reviewing the sensor data 130 against the original component file 118 for the component 104. This may also include calculating a required volume of filler material 208 required to form the patch 250.

The microcapsules 225 may then be introduced to (e.g., suspended in) the carrier fluid 211, and a magnetic field 230 may be created by the inductors 112 to induce the microcapsules 225 first toward the repair location 220 and then into physical contact with the repair location 220. The filler material 208 in the microcapsules 225 may then be then cured with appropriate heating method to form the patch 250. In this way, the microcapsules 225 and carrier fluid 211 may be used to transport the filler material 208 from the opening 207 to the repair location 220.

Figure 3A:
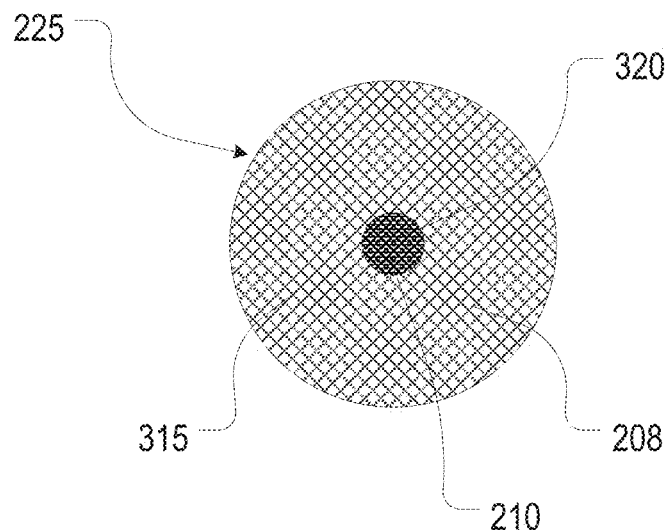
FIG. 3A is a cross sectional view of a first microcapsule embodiment.

The filler material 208 may be supplied to the repair location 220 in the form of microcapsules 225. FIG. 3A is a cross sectional view of a first microcapsule 225 embodiment. In this embodiment, the filler material 208 may be prepared as a coating 315 around a core 320 made from the ferromagnetic material 210. In some embodiments, the coating 315 may be 3D printed in situ, meaning that the 3D printer 100 may form the coating 315 around the core 320 nearby or even inside the narrow passage 205. These embodiments may be desirable because the resulting microcapsules 225 may be created relatively nearby the repair location 220 e.g., as near as the nozzle 106 can physically get to the repair location 220. These embodiments may also be desirable because the microcapsules 225 may be created as needed, and thus, may be relatively material efficient.

In some embodiments, the carrier fluid 111 may naturally carry the microcapsules 225 through the narrow passage 205 to the repair location 220. In other embodiments, pressure may be applied via the nozzle 106 and seal 109 to achieve a desired fluid flow rate through the narrow passage 205. In these embodiments, the required volume of carrier fluid 111 and/or the filler material 208 may be identified, and pushed from a storage area (not shown) fluidly connected to the nozzle 106 to the entry area of the narrow passage 205.

The inductors 112 may then be energized to create a magnetic field 230 that will attract the microcapsules 225 into contact with the repair location 220. Additionally or alternatively, an array of magnetic coils (not shown) may be manually placed on an exterior surface of the component 104, adjacent to the repair location 220, to create the magnetic field 230. The magnetic field 230 may induce the microcapsules 225 to flow through the carrier fluid 211 at a defined speed through the narrow passage 205 to the repair location 220 due to the interaction between the ferromagnetic material 210 in the microcapsules 225 and the magnetic field 230. The speed induced movement may be controlled by adjusting the strength of the applied magnetic field 230 and/or by selecting a carrier fluid 211 with more or less viscosity and/or by controlling a temperature of the carrier fluid.

After the microcapsules 225 have reached the repair location 220, the magnetic field 230 may further cause the microcapsules 225 to deposit onto the repair location 220. Next, an appropriate heating source can be applied, such ultrasound welding, laser welding, inductive heating, etc., so that the deposited filler material 208 may be cured/solidified, forming the patch 250.

If the narrow passage 205 has both an exit and an inlet opening 207, then at the exit of the narrow passage 205, any residual microcapsules 225 and/or carrier fluid 211 may be collected, and separated. The separated materials may then be reused for next printing cycle.

Figure 3B:
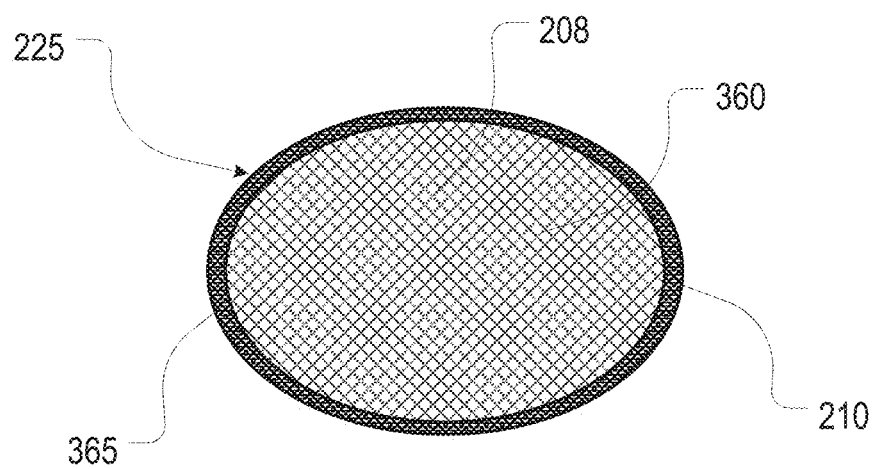
FIG. 3B is a cross sectional view of a second microcapsule embodiment.

FIG. 3B is a cross sectional view of a second microcapsule 225 embodiment. In this embodiment, a core 360 of the filler material 208 may be coated with a burstable shell 365 made from a ferromagnetic material 210, such as covalently bound organosilane-coated magnetic nanoparticles. In the embodiment in FIG. 3B, the burstable shell 365 may be adapted to rupture in the presence of an oscillating magnetic field 230 for controlled release of the filler material 208 from the core 360 at the repair location 220. Accordingly, the magnetic field 230 generated by the inductors 112 in these embodiments may be of sufficient strength and/or frequency to rupture the burstable shells 365 through magnetic stimulation of the ferromagnetic material 210. In some embodiments, application of such a magnetic field 230 may cause the ferromagnetic material 210 of the burstable shells 365 to rotate and/or vibrate at an accelerated rate, which may cause the burstable shells 365 to rupture and release the encapsulated filler material 208. These embodiments may be desirable because the burstable ferromagnetic shell 365 may allow for a relatively purer deposition of the filler material 208 at the repair location 220.

The filler material 208 in some embodiments may comprise any type of material suitable for additive manufacturing. Some non-limiting examples of the filler material 208 include acrylonitrile butadiene styrene (ABS), thermoplastic elastomers (TPEs), thermoplastic urethanes (TPUs), polylactic acid (PLA), polystyrene (PS), high-impact polystyrene (HIPS), polyethylene (PE), polyethylene terephthalate (PET), polyethylene terephthalate glycol-modified (PETG), polypropylene (PP), nylon, acrylonitrile styrene acrylate (ASA), polycarbonate (PC), polyvinyl alcohol (PVA), and others. In some embodiments, the filler material 208 may include a combination of two or more materials (e.g., a composite, a polymer blend, etc.). Although not explicitly shown, the filler material 208 may include any number of additives useful for improving processability, improving longevity, or improving mechanical, electrical, or temperature properties. For example, the filler material 208 may include plasticizers, nucleating agents, desiccants, impact modifiers, chain extenders, stabilizers, carboxyl scavengers, fillers (e.g., mineral, wood, metal, aramid, carbon, graphite, etc.), and the like.

In some embodiments, the ferromagnetic material 210 may be a pure or alloyed form of iron, nickel, cobalt, awaruite, wairauite, or another material with ferromagnetic properties. The ferromagnetic material 210 may be supplied in a particle, platelet, rod, short-fiber, long-fiber, and/or continuous-fiber form. Ferromagnetic material 210 may be incorporated around the filler material 208 as a shell in some embodiments. The ferromagnetic material 210 initially may be uniformly distributed throughout the carrier fluid 211 or may selectively added to the carrier fluid at predefined locations e.g., by the nozzle 106.

The carrier fluid 111 may be any material through which the microcapsules 225 can travel to the repair location 220, such as purified water or a mineral oil. However, the carrier fluid 211 will typically be selected such that the microcapsules 225 may be suspended therein, and such that chosen filler material 208 and/or ferromagnetic material 210 do not dissolve in the selected carrier fluid 111.

Figure 4:
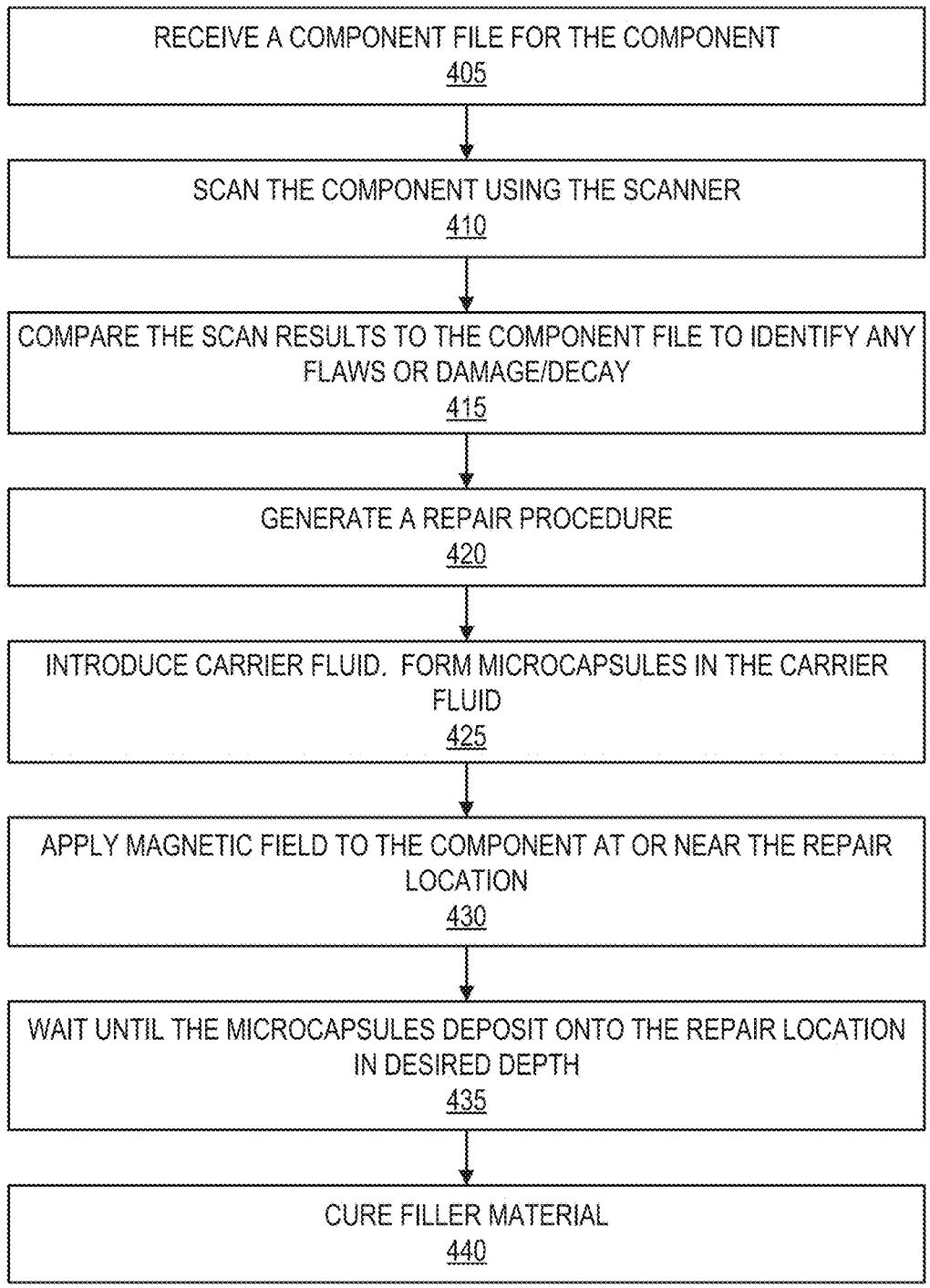
FIG. 4 is a flow chart illustrating a method of operating the 3D printer of FIGS. 1A and 1B, consistent with some embodiments.

FIG. 4 is a flow chart illustrating a method 400 of operating the 3D printer 100 of FIGS. 1A and 1B, consistent with some embodiments. At operation 405, the 3D printer 100 may receive a component file 118 for the component 104. The 3D printer 100 may then scan the component 104 using the scanner 114 at operation 410, and compare the scan results to the component file 118 at operation 415 to identify any flaws or damage/decay.

If any flaws or damage/decay is detected at operation 415, then the 3D printer 100 may generate a repair procedure at operation 420. Operation 420 may include generating printing parameters 120 from the component file 118 and the scan results. Printing parameters 120 may include a size and location of the repair location 220, a desired depth (i.e., thickness) for the resulting patch, an amount of 3D printing material needed to perform the repair, material parameters 124, and/or magnetic field parameters 126. In some embodiments, generating these printing parameters 120 may include utilizing the machine learning model 134 to generate predicted parameters 138, such as a prediction of one or more of the printing parameters 120. Thus, operation 420 may further include inputting the component file 118 to the machine learning model 134 and receiving from the machine learning model 134 one or more of nozzle parameters 122, material parameters 124, and/or magnetic field parameters 126.

At operation 425, the carrier fluid 211 may be introduced to the component 104 and/or the microcapsules 225 may be formed in the carrier fluid 211. In some embodiments, this operation 425 may include forming the microcapsules 225 by using additive manufacturing to coat a ferromagnetic core 320 with filler material 208. In some embodiments, this operation 425 may be performed as close to the repair location 220 as possible. Alternatively, in some embodiments, pre-formed microcapsules 225 may be added to the carrier fluid 111 at operation 425.

Next, at operation 430, a magnetic field 230 may be applied to the component 104 at or near the repair location 220 at operation 430. In some embodiments, the magnetic field 230 may be applied using the inductors 112 surrounding the platform 102 of the 3D printer 100. Additionally or alternatively, this operation 430 may include manually applying a magnetic field generator to the surface of the component 104, adjacent to the repair location 220.

Some embodiments may then wait until the microcapsules 225 deposit onto the repair location 220 to a desired depth at operation 435. In some embodiments, the depth and location of the microcapsules 225 may be measured in real time using the scanner 114. Once sufficient microcapsules 225 have accumulated at the repair location, then the inductors 112 may optionally be driven at a higher strength and/or frequency to rupture the burstable shells 365. The heating element may be activated to cure the filler material 208 at operation 440.

Although illustrative embodiments have been described with reference to a magnetic fields 230 and a ferromagnetic material 210, other embodiments are consistent with this disclosure. For example, some embodiments may use electric forces and/or electrostatic forces to bias the microcapsules 225 toward the repair location 220. In these embodiments, instead of a ferromagnetic material 210, the microcapsules 225 may be selectively loaded with an insulative additive that is useful for generating and/or holding a surface charge. Likewise, instead of inductors 112, these embodiments may utilize electrostatic generators or electrostatic motors (e.g., machines configured to generate relatively high voltages at relatively low electrical currents) capable of generating an electric field or electric charge.

Additionally, while embodiments describe delivering the microcapsules by sealably engaging the nozzle 106 with the component 104, other delivery mechanisms are possible. For example, the component 104 may be immersed in a container of carrier fluid 111 in some embodiments. The carrier fluid 111 and the microcapsules 225 may then flow naturally into and through the narrow passage 205 using only atmospheric pressure. In some of these embodiments, the microcapsules 225 may be uniformly dispersed in the container of carrier fluid 111. In others, the microcapsules may be formed on-demand proximate to an opening into the narrow passageway.

Figure 5:
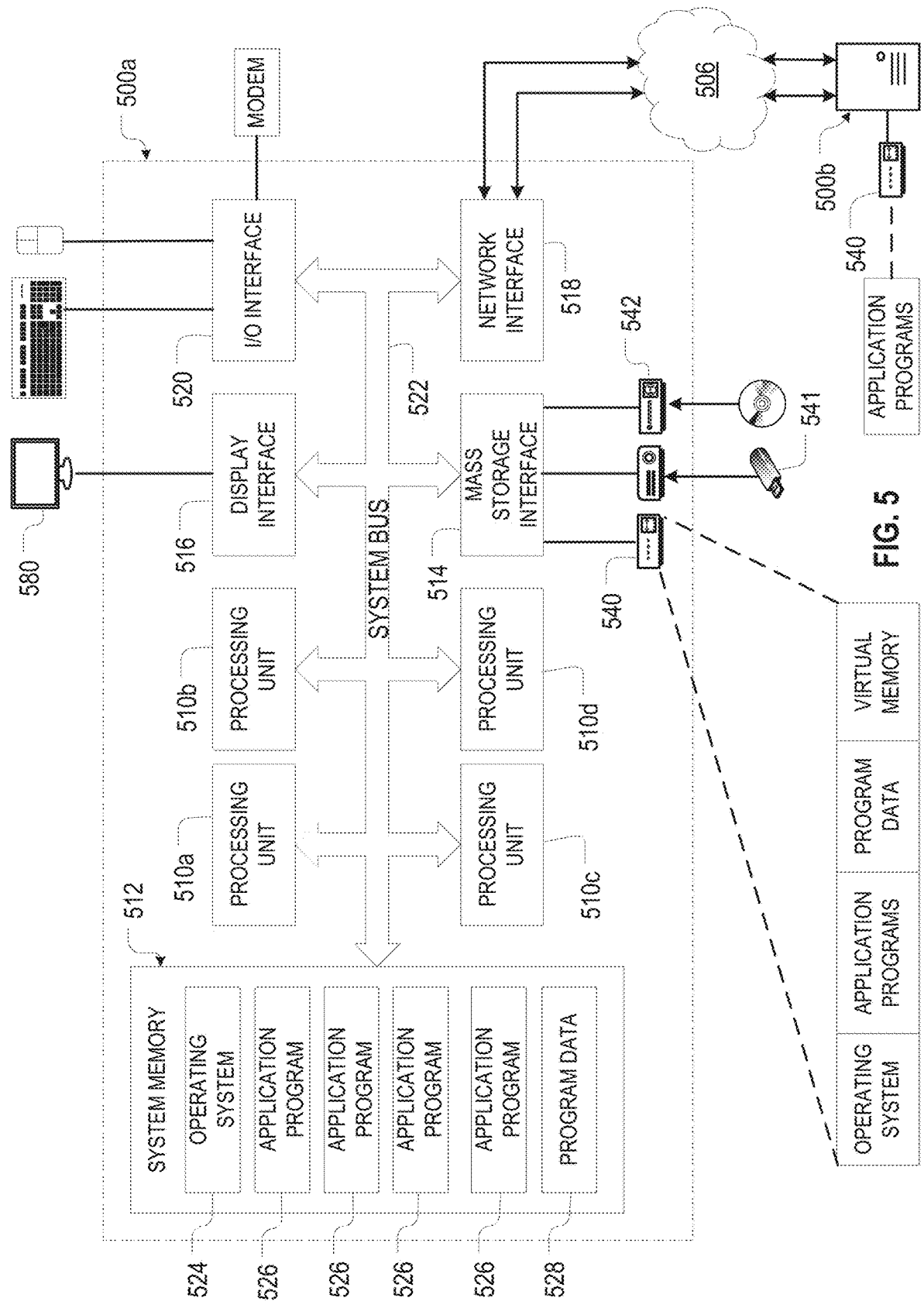
FIG. 5 illustrates one embodiment of a data processing system that may be used to implement the print manager, consistent with some embodiments.

FIG. 5 illustrates one embodiment of a data processing system (DPS) 500a, 500b (herein generically referred to as a DPS 500) that may be used to implement the print manager 116, consistent with some embodiments. FIG. 5 only depicts the representative major components of the DPS 500, and those individual components may have greater complexity than represented in FIG. 5. In some embodiments, the DPS 500 may be implemented as a personal computer; server computer; portable computer, such as a laptop or notebook computer, PDA (Personal Digital Assistant), tablet computer, or smartphone; processors embedded into larger devices, such as an automobile, airplane, teleconferencing system, appliance; smart devices; or any other appropriate type of electronic device. Moreover, components other than or in addition to those shown in FIG. 1 may be present, and that the number, type, and configuration of such components may vary.

The data processing system 500 in FIG. 5 may comprise a plurality of processing units 510a-510d (generically, processor 510 or CPU 510) that may be connected to a main memory 512, at least one mass storage interface 514, a terminal/display interface 516, at least one network interface 518, and an input/output ("I/O") interface 520 by a system bus 522. The mass storage interfaces 514 in this embodiment may connect the system bus 522 to one or more mass storage devices, such as a direct access storage device 540, a USB drive 541, and/or a readable/writable optical disk drive 542. The network interfaces 518 may allow the DPS 500a to communicate with other DPS 500b over a network 506. The main memory 512 may contain an operating system 524, a plurality of application programs 526, and program data 528.

The DPS 500 embodiment in FIG. 5 may be a general-purpose computing device. In these embodiments, the processors 510 may be any devices capable of executing program instructions stored in the main memory 512, and may themselves be constructed from one or more microprocessors and/or integrated circuits. In some embodiments, the DPS 500 may contain multiple processors and/or processing cores, as is typical of larger, more capable computer systems; however, in other embodiments, the computing systems 500 may only comprise a single processor system and/or a single processor designed to emulate a multiprocessor system. Further, the processor(s) 510 may be implemented using a number of heterogeneous data processing systems 500 in which a main processor 510 is present with secondary processors on a single chip. As another illustrative example, the processor(s) 510 may be a symmetric multiprocessor system containing multiple processors 510 of the same type.

When the DPS 500 starts up, the associated processor(s) 510 may initially execute program instructions that make up the operating system 524. The operating system 524, in turn, may manage the physical and logical resources of the DPS 500. These resources may include the main memory 512, the mass storage interface 514, the terminal/display interface 516, the network interface 518, and the system bus 522. As with the processor(s) 510, some DPS 500 embodiments may utilize multiple system interfaces 514, 516, 518, 520, and buses 522, which in turn, may each include their own separate, fully programmed microprocessors.

Instructions for the operating system 524 and/or application programs 526 (generically, "program code," "computer usable program code," or "computer readable program code") may be initially located in the mass storage devices, which are in communication with the processor(s) 510 through the system bus 522. The program code in the different embodiments may be embodied on different physical or tangible computer-readable media, such as the memory 512 or the mass storage devices. In the illustrative example in FIG. 1, the instructions may be stored in a functional form of persistent storage on the direct access storage device 540. These instructions may then be loaded into the main memory 512 for execution by the processor(s) 510. However, the program code may also be located in a functional form on the computer-readable media, such as the direct access storage device 540 or the readable/writable optical disk drive 542, that is selectively removable in some embodiments. It may be loaded onto or transferred to the DPS 500 for execution by the processor(s) 510.

With continuing reference to FIG. 5, the system bus 522 may be any device that facilitates communication between and among the processor(s) 510; the main memory 512; and the interface(s) 514, 516, 518, 520. Moreover, although the system bus 522 in this embodiment is a relatively simple, single bus structure that provides a direct communication path among the system bus 522, other bus structures are consistent with the present disclosure, including without limitation, point-to-point links in hierarchical, star or web configurations, multiple hierarchical buses, parallel and redundant paths, etc.

The main memory 512 and the mass storage device(s) 540 may work cooperatively to store the operating system 524, the application programs 526, and the program data 528. In some embodiments, the main memory 512 may be a random-access semiconductor memory device ("RAM") capable of storing data and program instructions. Although FIG. 5 conceptually depicts that the main memory 512 as a single monolithic entity, the main memory 512 in some embodiments may be a more complex arrangement, such as a hierarchy of caches and other memory devices. For example, the main memory 512 may exist in multiple levels of caches, and these caches may be further divided by function, such that one cache holds instructions while another cache holds non-instruction data that is used by the processor(s) 510. The main memory 512 may be further distributed and associated with a different processor(s) 510 or sets of the processor(s) 510, as is known in any of various so-called non-uniform memory access (NUMA) computer architectures. Moreover, some embodiments may utilize virtual addressing mechanisms that allow the DPS 500 to behave as if it has access to a large, single storage entity instead of access to multiple, smaller storage entities (such as the main memory 512 and the mass storage device 540).

Although the operating system 524, the application programs 526, and the program data 528 are illustrated in FIG. 5 as being contained within the main memory 512 of DPS 500a, some or all of them may be physically located on a different computer system (e.g., DPS 500b) and may be accessed remotely, e.g., via the network 506, in some embodiments. Moreover, the operating system 524, the application programs 526, and the program data 528 are not necessarily all completely contained in the same physical DPS 500a at the same time, and may even reside in the physical or virtual memory of other DPS 500b.

The system interfaces 514, 516, 518, 520 in some embodiments may support communication with a variety of storage and I/O devices. The mass storage interface 514 may support the attachment of one or more mass storage devices 540, which may include rotating magnetic disk drive storage devices, solid-state storage devices (SSD) that uses integrated circuit assemblies as memory to store data persistently, typically using flash memory or a combination of the two. Additionally, the mass storage devices 540 may also comprise other devices and assemblies, including arrays of disk drives configured to appear as a single large storage device to a host (commonly called RAID arrays) and/or archival storage media, such as hard disk drives, tape (e.g., mini-DV), writable compact disks (e.g., CD-R and CD-RW), digital versatile disks (e.g., DVD, DVD-R, DVD+R, DVD+RW, DVD-RAM), holography storage systems, blue laser disks, IBM Millipede devices, and the like. The I/O interface 520 may support attachment of one or more I/O devices, such as a keyboard 581, mouse 582, modem 583, or 3D printer 100 (see FIG. 1)

The terminal/display interface 516 may be used to directly connect one or more displays 580 to the data processing system 500. These displays 580 may be non-intelligent (i.e., dumb) terminals, such as an LED monitor, or may themselves be fully programmable workstations that allow IT administrators and users to communicate with the DPS 500. Note, however, that while the display interface 516 may be provided to support communication with one or more displays 580, the computer systems 500 does not necessarily require a display 580 because all needed interaction with users and other processes may occur via the network 506.

The network 506 may be any suitable network or combination of networks and may support any appropriate protocol suitable for communication of data and/or code to/from multiple DPS 500. Accordingly, the network interfaces 518 may be any device that facilitates such communication, regardless of whether the network connection is made using present-day analog and/or digital techniques or via some networking mechanism of the future. Suitable networks 506 include, but are not limited to, networks implemented using one or more of the "InfiniBand" or IEEE (Institute of Electrical and Electronics Engineers) 802.3x "Ethernet" specifications; cellular transmission networks; wireless networks implemented one of the IEEE 802.11x, IEEE 802.16, General Packet Radio Service ("GPRS"), FRS (Family Radio Service), or Bluetooth specifications; Ultra-Wide Band ("UWB") technology, such as that described in FCC 02-48; or the like. Those skilled in the art will appreciate that many different network and transport protocols may be used to implement the network 506. The Transmission Control Protocol/Internet Protocol ("TCP/IP") suite contains a suitable network and transport protocols.

Aspects of the present disclosure may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to explain the principles of the embodiments, the practical application or technical improvement over technologies found in the marketplace, or to enable others of ordinary skill in the art to understand the embodiments disclosed herein. Therefore, it is desired that the embodiments described herein be considered in all respects as illustrative, not restrictive, and that reference be made to the appended claims for determining the scope of the invention.

What is claimed is:

1. A three-dimensional printer, comprising:
   one or more processors; and
   a memory communicatively coupled to the one or more processors, wherein the memory comprises instructions which, when executed by the one or more processors, cause the three-dimensional printer to perform a method comprising:
   coating a ferromagnetic material with a filler material to form a microcapsule; and
   applying a controlled magnetic field to attract the microcapsule towards a repair location in a passage of a pipe or manifold.

2. The three-dimensional printer of claim 1, wherein the method further comprises supplying a carrier fluid containing the microcapsule into the narrow passage.

3. The three-dimensional printer of claim 1, wherein applying the controlled magnetic field comprises generating an external magnetic field around the component, proximate to the narrow passage.

4. The three-dimensional printer of claim 1, wherein the method further comprises heating the repair location to solidify the filler material.

5. The three-dimensional printer of claim 1, wherein the method further comprises scanning the component to identify a current thickness of the filler material at the repair location.

6. The three-dimensional printer of claim 1, wherein the ferromagnetic material is adapted to interact with the controlled magnetic field to attract the microcapsule to the repair location.

7. The three-dimensional printer of claim 1, wherein coating the ferromagnetic material with the filler material to form the microcapsule comprises 3D printing the filler material around a ferromagnetic core.

8. The three-dimensional printer of claim 1, wherein:
   the microcapsule comprises a burstable microcapsule; and
   the ferromagnetic material is adapted to interact with the controlled magnetic field to attract the burstable microcapsule to the repair location.

9. The three-dimensional printer of claim 8, further comprising rupturing the burstable microcapsule with the magnetic field.

10. The three-dimensional printer of claim 1, wherein the method further comprises scanning the component to identify a current thickness of the filler material at the repair location.

11. The three-dimensional printer of claim 1, wherein the method further comprises scanning the component to calculate a volume of additional filler material to repair a defect at the repair location.

12. The three-dimensional printer of claim 11, wherein the method further comprises applying the controlled magnetic field to attract the calculated volume of additional filler material to the repair location.

13. The three-dimensional printer of claim 1, wherein the component comprises a manifold.

14. The three-dimensional printer of claim 1, wherein the method further comprises:
   suspending the microcapsule in a carrier fluid; and
   supplying the carrier fluid into the narrow passage.

15. The three-dimensional printer of claim 14, wherein supplying the carrier fluid into the narrow passage comprises sealably engaging a nozzle to an entrance of the narrow passage.

16. The three-dimensional printer of claim 14, wherein supplying the carrier fluid into the narrow passage comprises immersing the component in the carrier fluid.

* * * * *